Oct. 8, 1940.  C. LIEBMAN  2,217,120
COPYING CAMERA
Filed Feb. 18, 1938   11 Sheets-Sheet 1

Inventor:
Charles Liebman
By May Richard Kraus
Atty.

Oct. 8, 1940.   C. LIEBMAN   2,217,120
COPYING CAMERA
Filed Feb. 18, 1938   11 Sheets-Sheet 3

Inventor:
Charles Liebman

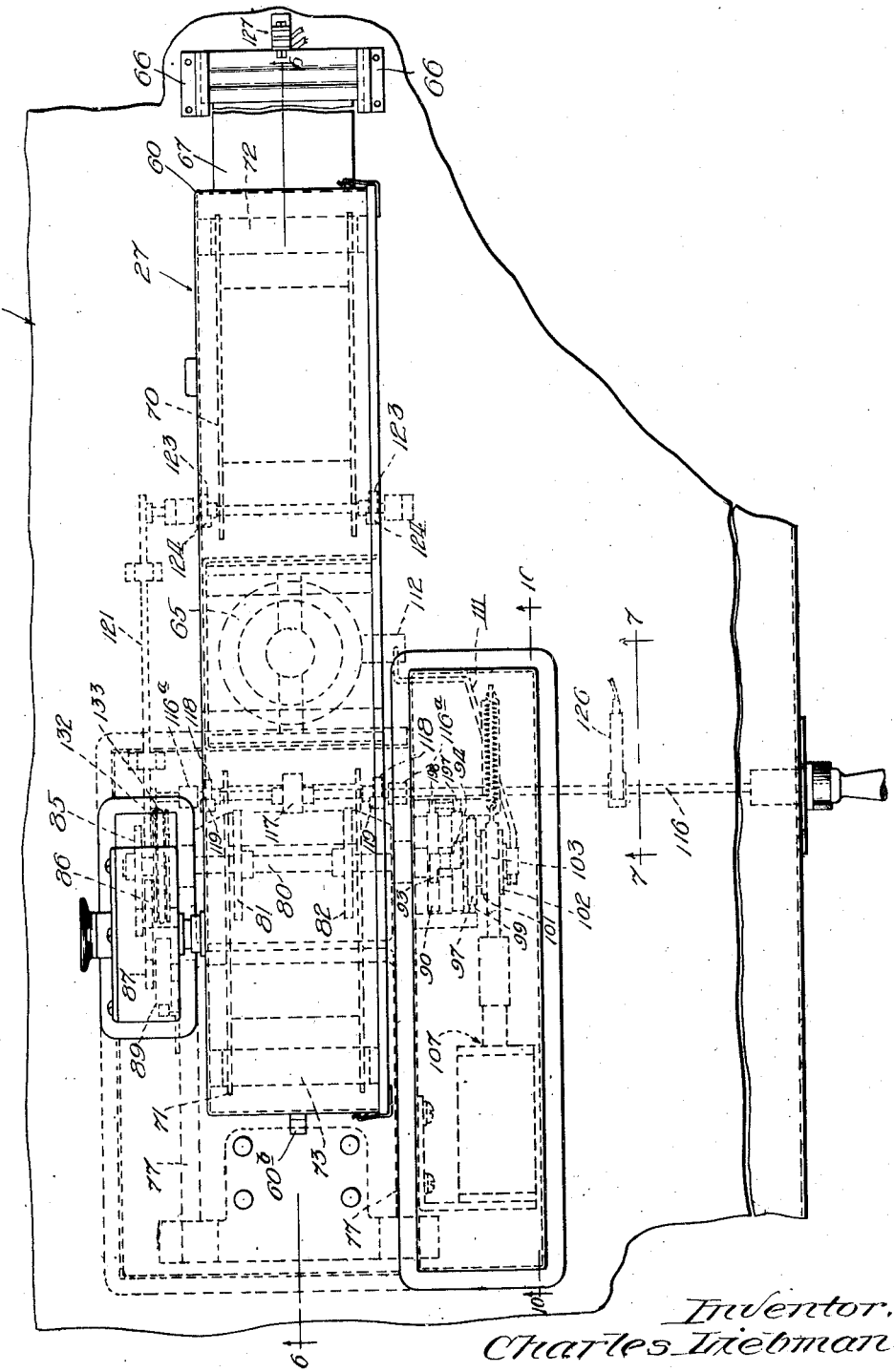

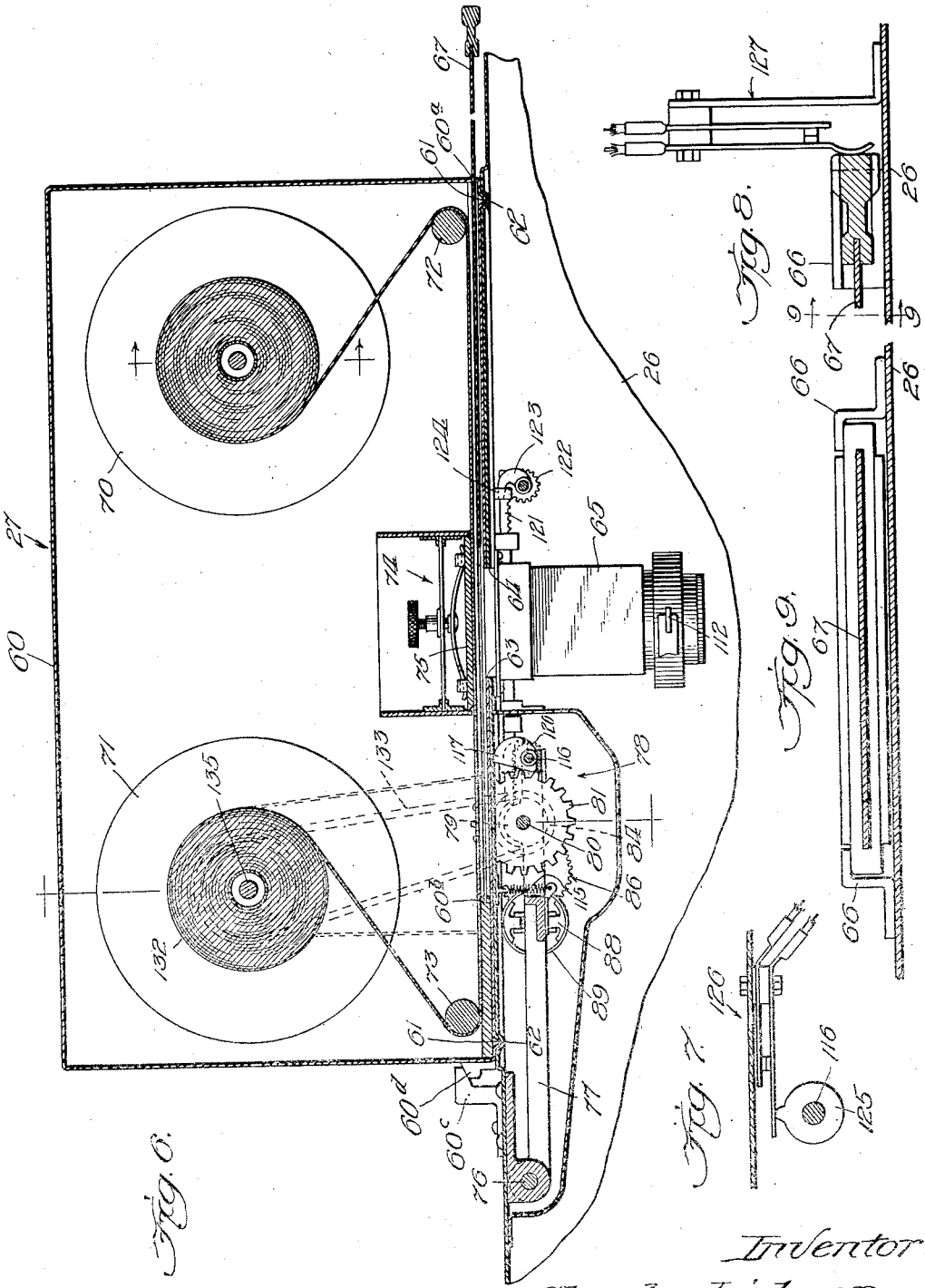

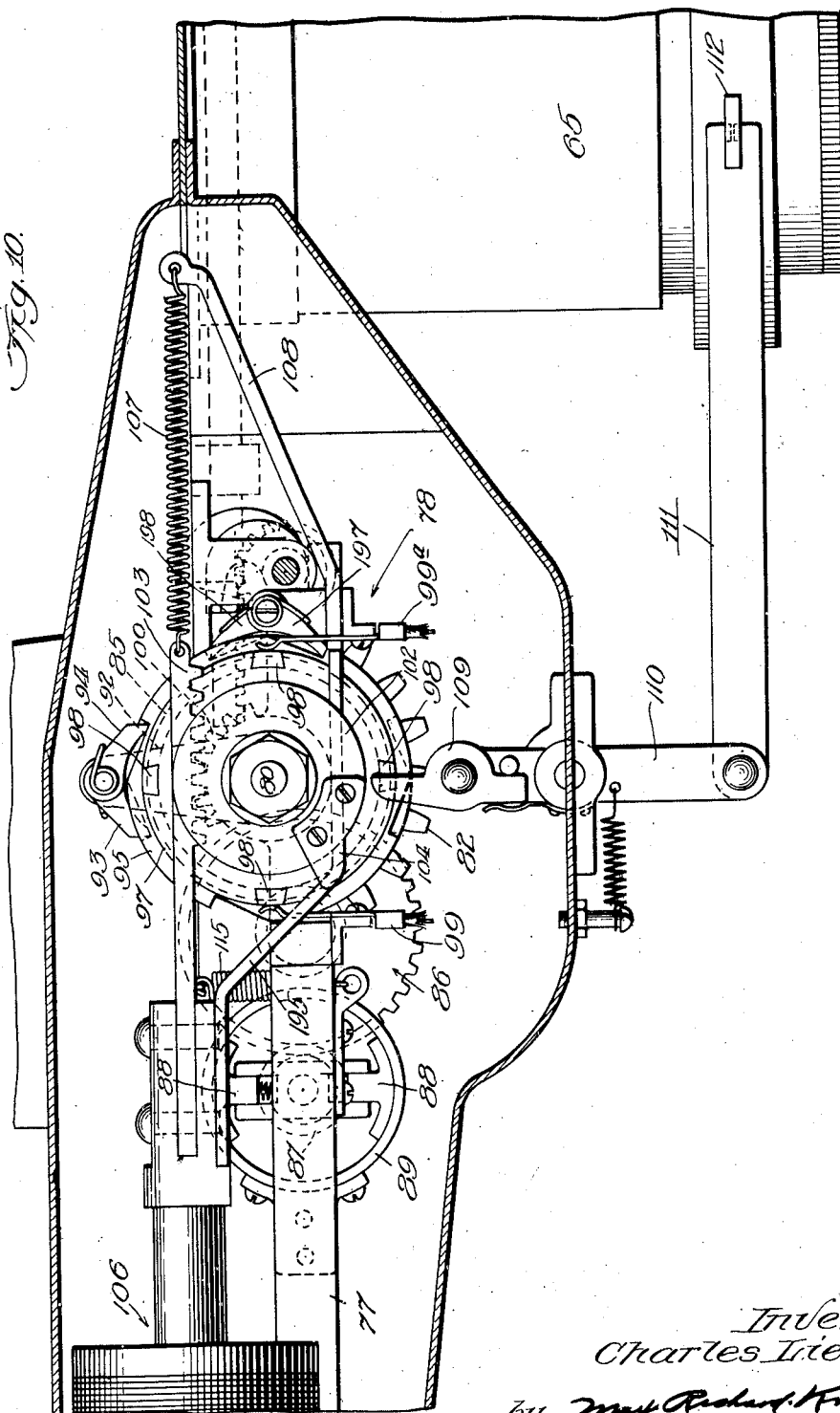

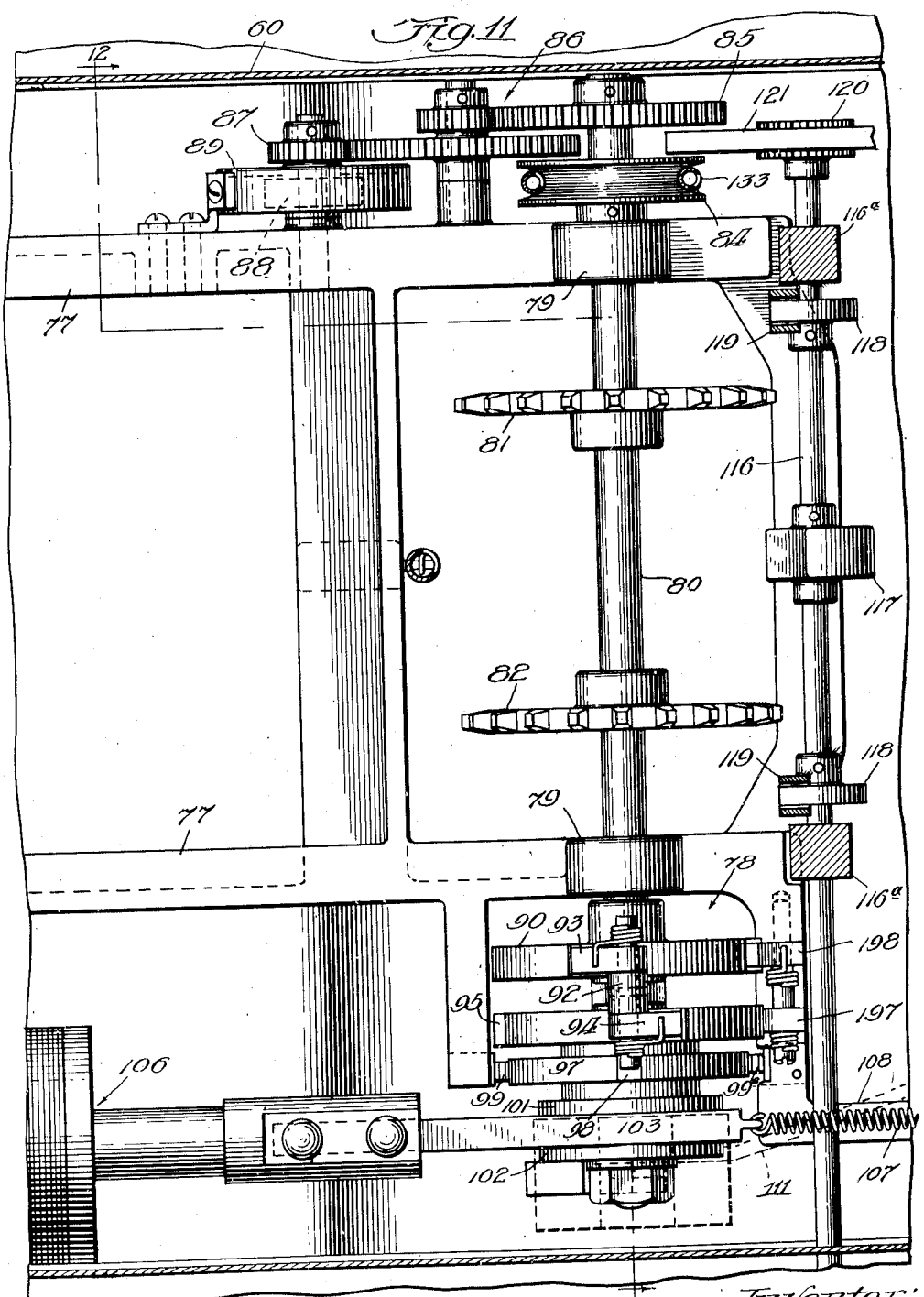

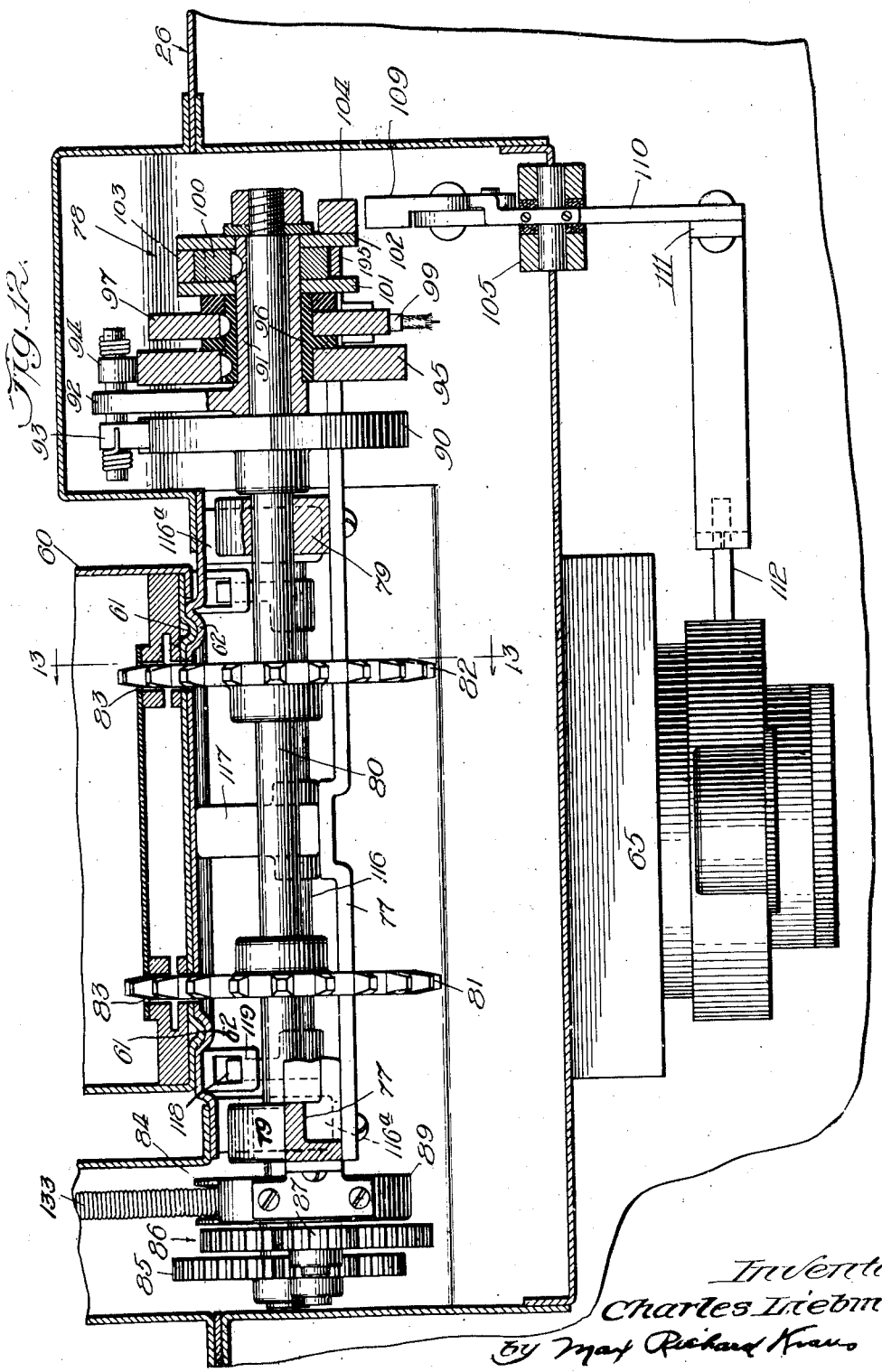

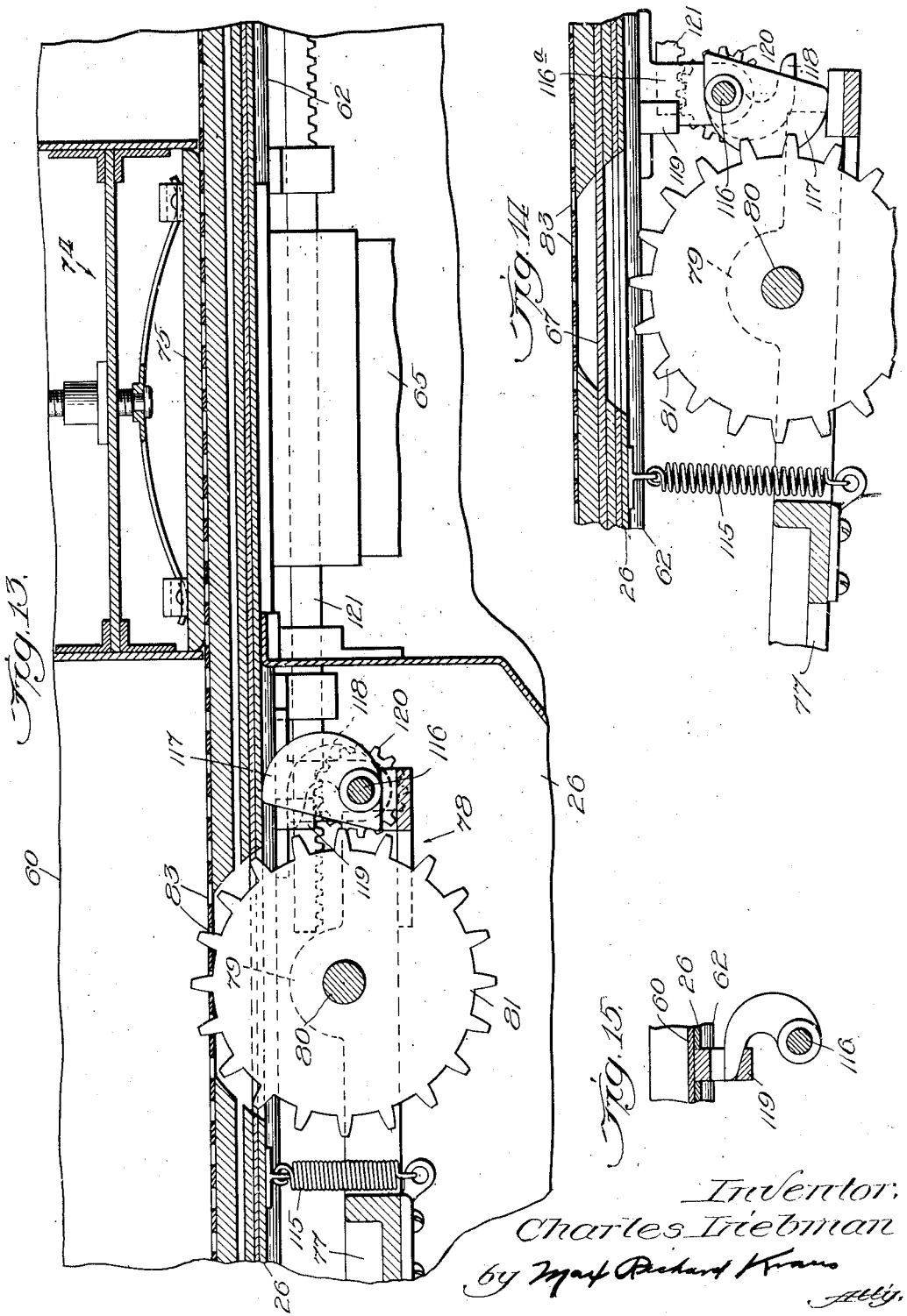

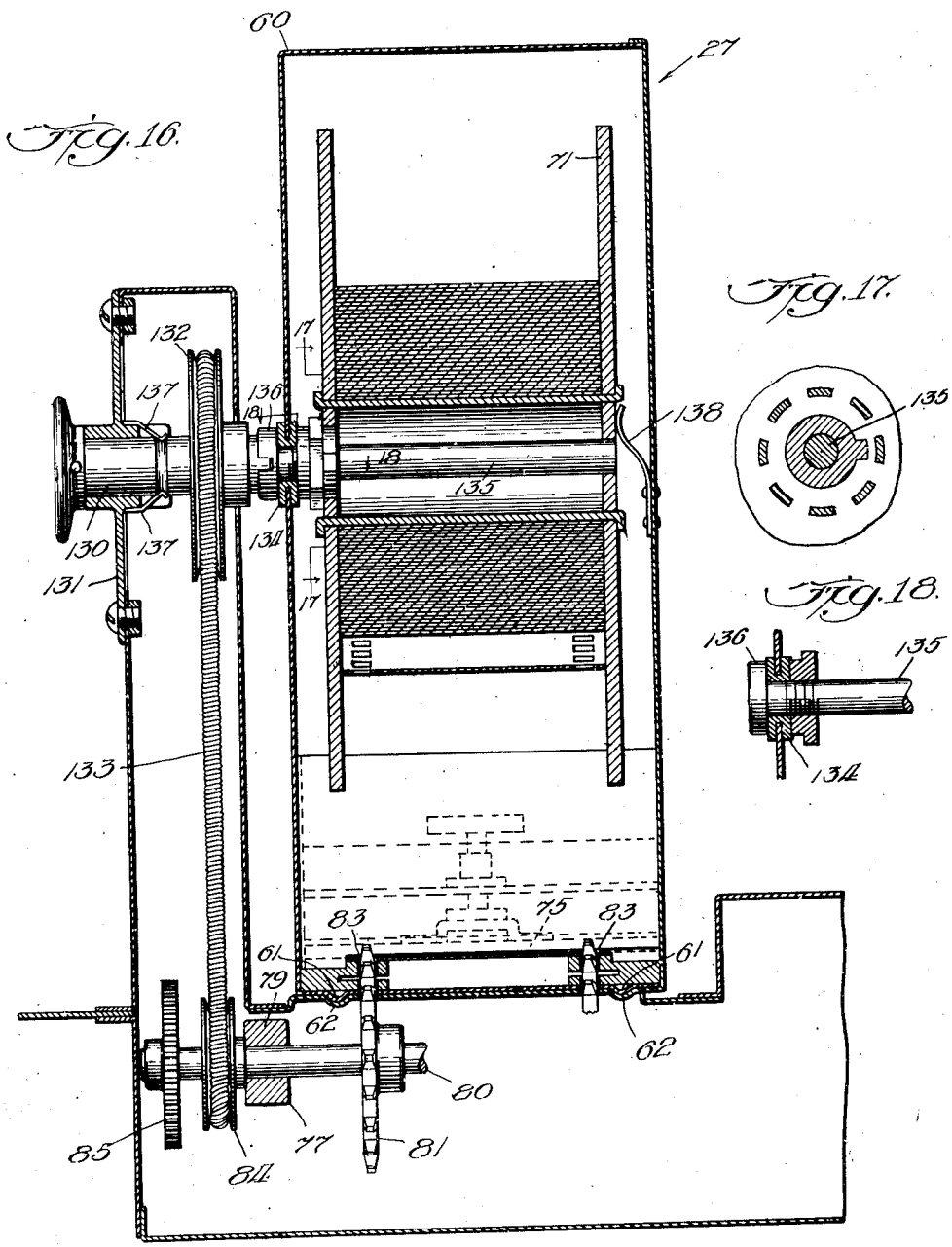

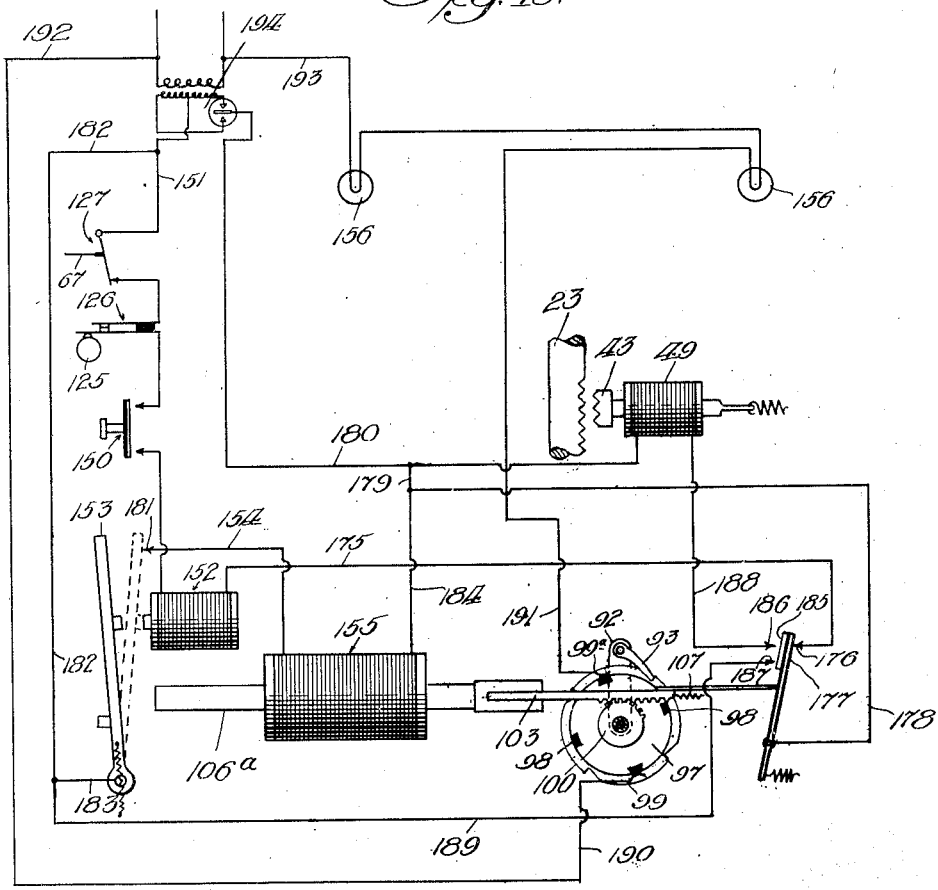

Patented Oct. 8, 1940

2,217,120

UNITED STATES PATENT OFFICE 2,217,120

COPYING CAMERA

Charles Liebman, Chicago, Ill.

Application February 18, 1938, Serial No. 191,171

12 Claims. (Cl. 88—24)

This invention relates to a copying camera and more particularly to a machine for photographically copying records and the like.

One of the objects of my invention is to provide a copying camera which is automatically operated after the starting switch is closed and which is foolproof during operation.

Another object of my invention is to provide a copying camera in which the magazine is undetachably locked to the camera while the machine is in operation.

Another object of my invention is to provide a copying camera in which the exposure opening of the magazine is closed before the magazine is removable from the camera.

Another object of my invention is to provide a copying camera which is locked against movement with relation to the object being copied while the camera is in operation.

Another object of my invention is to provide a copying camera in which after the machine is set in operation the film is first advanced, and subsequently the lights and shutter are then simultaneously operated for photographic exposure of the film.

Another object of my invention is to provide a copying camera in which the supporting table is formed of a plurality of sections, each independently movable so that the surface of the object to be photographed can be positioned on a flat horizontal plane with respect to the camera, regardless of the differences of depth of various parts of the object.

Another object is to provide a copying camera in which the light chamber, camera and pressure plate are movable as a unit.

Another object is to provide a copying camera in which the camera remains in a fixed relationship to the pressure plate.

Another object is to provide means for effecting a light seal between the pressure plate and supporting table.

Another object is to provide a housing for use with copying cameras which has a pressure plate adapted to be positioned on the object to be copied and which has a camera mounted on said housing in fixed relationship to said plate.

Another object of my invention is to provide a copying camera which is neat and compact in construction and economical to manufacture.

Other objects will become apparent as this description progresses.

In the drawings:

Figure 5 is a top plan view showing more particularly the actuating mechanism;

Figure 6 is a cross sectional view taken on the line 6—6 of Figure 5;

Figure 7 is a view taken on the line 7—7 of Figure 5, showing the switch adapted to be operated by the movement of the clamping hooks;

Figure 8 is a view taken on the right hand side of Figure 5, showing the switch operated by the magazine slide;

Figure 9 is a view taken on the line 9—9 of Figure 6 showing the manner of locking the slide when the slide is in its retracted position.

Figure 10 is a side elevational view taken on the line 10—10 of Figure 5;

Figure 11 is a plan view of the actuating mechanism;

Figure 12 is a view taken on the lines 12—12 of Figure 11 of the actuating mechanism;

Figure 13 is a cross sectional view taken on the line 13—13 of Figure 12 showing the sprocket wheels in engagement with the film;

Figure 14 is a view similar to Figure 13, but showing the sprocket gears out of engagement with the film;

Figure 15 is a cross sectional view showing the clamping hooks in engagement with the loops to lock the magazine to the housing;

Figure 16 is a cross sectional view showing more particularly the take up spool and the means for rotating said spool;

Figure 17 is a cross sectional view taken on the line 17—17 of Figure 16;

Figure 18 is a view taken on the line 18—18 of Figure 16;

Figure 19 is a diagrammatic view of the electrical circuit in connection with my machine.

Figure 1:
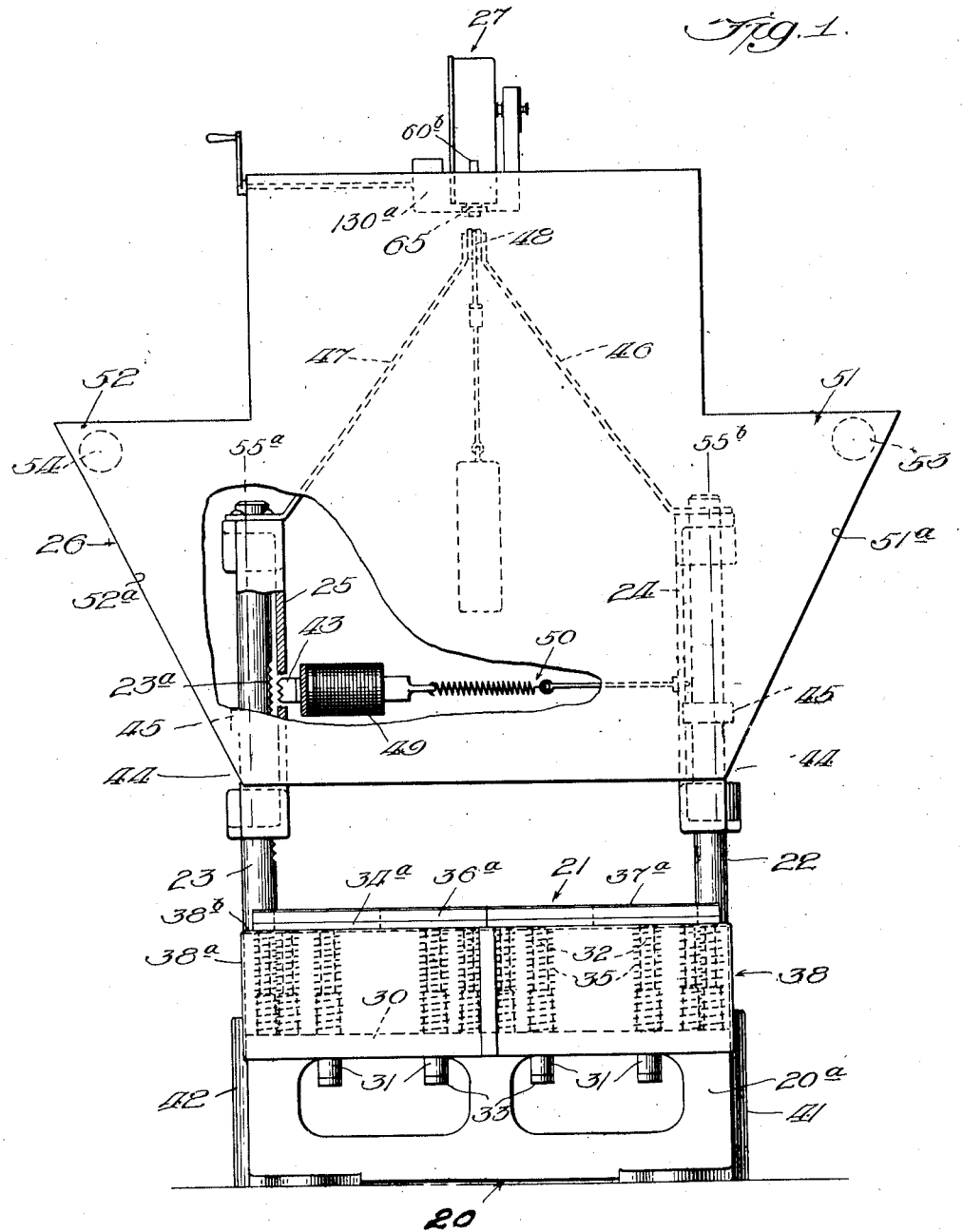
Figure 1 is a front elevational view showing my copying camera.
Figure 2:
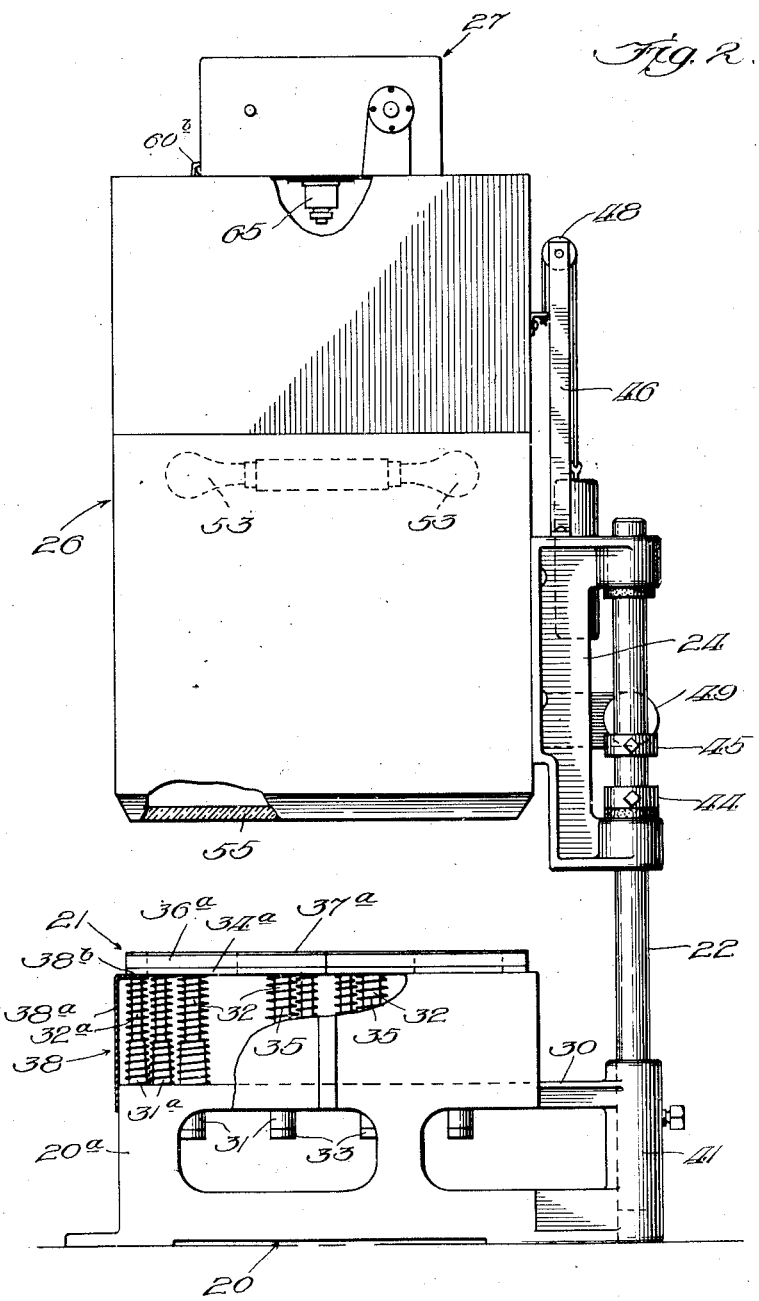
Figure 2 is a side elevational view thereof.
Figure 3:
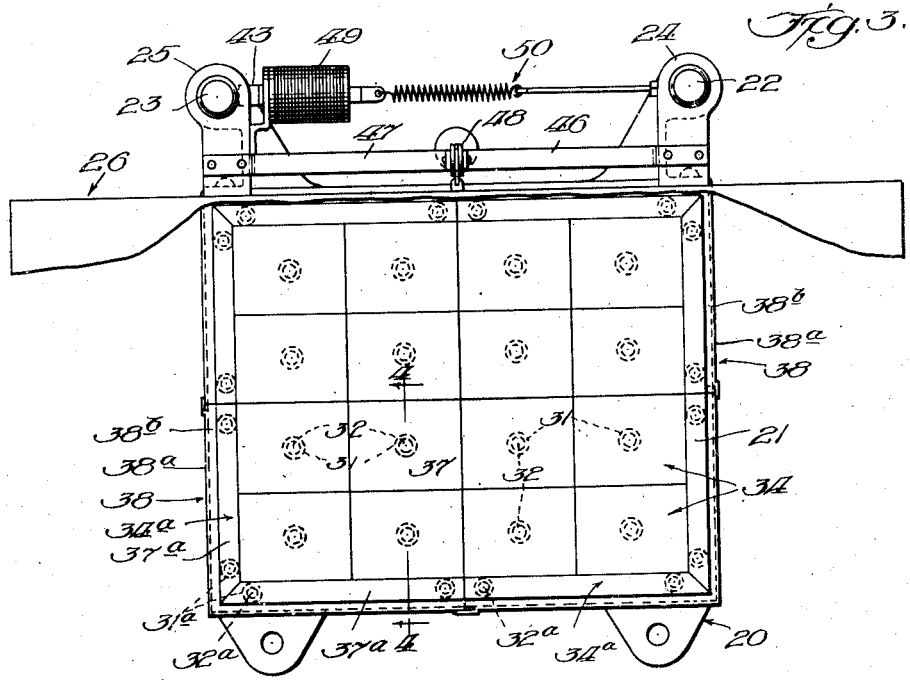
Figure 3 is a top plan view showing more particularly the supporting table.

Referring to Figures 1, 2, 3 and 4, my copying camera comprises a base indicated generally at 20, which is provided with a table 21 on which the object to be photographically copied is placed. Secured to the base are a pair of upright posts 22 and 23 which through brackets 24 and 25 serve to support the camera housing 26. On top of said housing I place the magazine compartment 27 which retains the films.

*Base and support table*

The base 20 is provided with an upright portion 20a upon which is suitably secured a cross support 30. The cross support is provided at equally spaced distances with vertically extending guiding bosses 31 in which are supported vertically movable rods 32. The lower end of the rods are flanged as at 33 to limit the upward movement thereof, while secured to the upper end of each of said rods is a substantially rectangular plate 34. Surrounding the rod and serving to maintain the rod in its uppermost position is a coiled spring 35. It will be noted that the plates can each be moved vertically independent of the other and the movement of one does not affect the movement of the others. Mounted on each plate is a sponge rubber section 36. Permanently secured to said sponge material is a plush or velvet material 37. Supported on the base is a housing generally indicated at 38, which encloses the supporting rods. The housing is divided into eight sections each of which have a side member 38a and a narrow flanged portion 38b, which forms the border for the table. Supporting each of said border sections are a pair of rods 32a (only one being shown in Fig. 4) which rods are supported in bosses 31a and spring raised similar to the rods 32. As seen the border sections are maintained in raised position, and each of the border sections are movable vertically independently of the other. Secured to the top of each border section is a plate 34a, a sponge material 36a and a plush or velvet section 37a similar to the plates 34.

The rear of the base is provided with a pair of upright supports 41 and 42, each of which retains the vertical post 22 and 23 respectively. As shown in Figure 1 the post 23 is provided with teeth 23a to be engaged by a rack bar 43 presently to be described. Vertically slidable on said posts are a pair of U shaped bracket arms 24 and 25 to which is secured the camera housing 26. It will be seen that the camera housing can be moved up or down on the said posts, provided the rack bar 43 is not in engagement with the teeth 23a on the post. Positioned on the post 22 are a pair of adjustable collars 44 and 45 which serve to limit the upward or downward movement of said housing on said posts. Secured to the top of the vertical posts 22 and 23 are a pair of inclined bars 46 and 47 which serve to support a pulley 48. Suitably supported on the bracket 25 is a solenoid 49 which operates the rack bar 43 to engage the teeth on the post. The other end of the rack bar is secured to the opposite bracket 24 by a spring and rod 50 which normally serve to retain the rack bar out of engagement with the teeth, and only when the electrical circuit through said solenoid is closed with the rack bar be in engagement with the teeth on the post to positively lock it in engagement therewith and prevent any relative movement of said housing on said posts.

Housing

Figure 4:
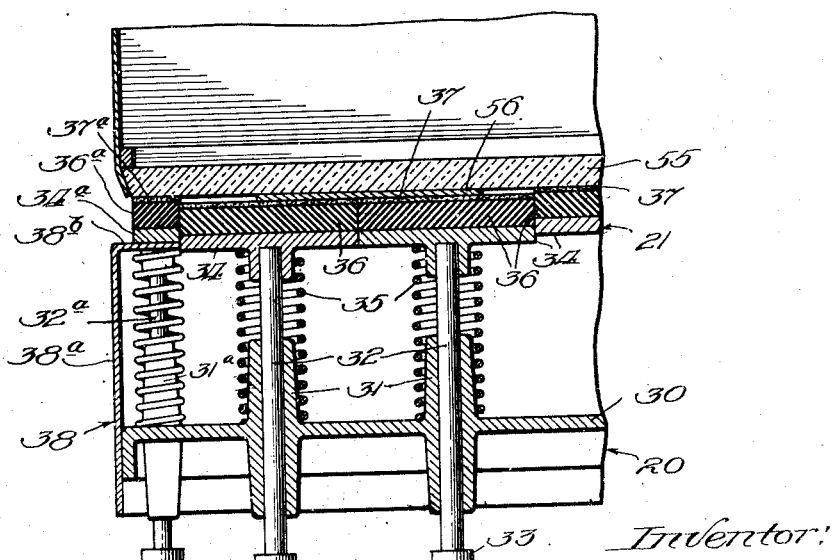
Figure 4 is a cross sectional view taken on the line 4—4 of Figure 3.

As heretofore mentioned the entire housing is secured to the bracket arms to be moved therewith. As more particularly shown in Figure 1, the housing is provided with a pair of lateral wing sections 51 and 52 which merge into the vertical sections of the housing. In the upper corners of the wing sections I provide the illuminating means 53 and 54 such as the incandescent lamps which are used for the purpose of illuminating the interior of the housing at the time an exposure takes place. To close the bottom of the housing I provide a plate of refractory transparent material 55 which permits penetration of light rays. Lining the wing sections of the housing is a reflecting surface 51a and 52a which serves to reflect the rays of lights. The lamps 53 and 54 are positioned with relation to the lens of the camera 65, so that the angle between the lamps and perpendiculars raised from the edges (55a and 55b) of the glass plate 55 is greater than the angle between such perpendiculars and the lens. By this positioning the angle of incidence to the glass plate of all rays of light from the lamps and from the reflecting surfaces 51a and 52a of the wings 51 and 52, will be such as to cause all such rays to be reflected to points beyond the camera lens, thus eliminating glare. Furthermore the reflecting surfaces will diffuse and equalize the distribution of light on the objects to be photographed. As will be seen more particularly in Figure 4, the object 56 to be photographically copied is placed upon the table and the housing 26 is lowered until the plate 55 comes in contact with the object. If the object to be photographed has any depth, the pressure caused by the downward movement of the housing will cause the sections 36 of the supporting table to be depressed to the extent necessary to accommodate the depth of the object. As shown in Figure 4, two of the sections are depressed to provide the necessary accommodation for the depth of the article while at the same time the border sections remain undepressed. If the object to be photographed is uneven, such as where pages of a book are to be photographed in which one section has a greater depth than the other, the plates will be depressed to accommodate the difference produced by the varying depths, likewise if the object is wrinkled or rough, the sponge table or velvet will provide the necessary "give" so that the surface 55 of the housing will rest flat on the object and will also smooth out any wrinkles in the object and press the surface into focal plane against the plate 55.

Magazine

Detachably secured to the top of the housing is the magazine 27 which supports the film. Referring specifically to Figures 6 and 12 it will be seen that the magazine has a housing 60, the bottom of which has a ridge 61 which fits into a groove 62 provided in the top of the housing 26 to position the magazine on the housing. The bottom of the magazine housing has an exposure opening 63 which registers with the opening 64 provided in the top of the housing 26 and in which opening is suitably retained the camera 65. The magazine housing is provided with a side openings 60a through which is slid the slide 70. The opposite end of the slide when fully inserted rests in a supporting recess 60b. Secured to the top of the housing 26, I provide a pair of channel locking bars 66 which when the slide is drawn outwardly in retracted position (as shown in Fig. 9) will rest within the channel bars and thus prevent the magazine from being removed from the housing, while the slide is in this position. It will be understood that with the slide in fully inserted position as shown in Fig. 6, the slide will be out of engagement with the channel bars 66. This prevents any accidental exposures which might take place if the magazine were removed from the camera housing without the exposure opening 63 closed. On the opposite side of the housing I provide a latch 60c which engages the magazine as 60d and with the slide in its "in" position and the actuating mechanism out of engagement with the film as will presently be described, the magazine can be removed from the housing by slightly tilting it and releasing the latch. Within the magazine housing I provide a pair of film spools 70 and 71, one of which, 70, serves to support the unexposed film and the other the take-up spool, 71, supports the film after it has been exposed. As the film comes from the spool, 70, it passes under a transverse guide roller 72 then travels longitudinally over the exposure opening 63, then under another guide roller 73 and onto the takeup spool 71. Directly over the exposure opening and suitably secured to the bottom of the magazine housing, I provide an adjustable pressure plate generally indicated at 74 which by means of an adjustable spring tensioned plate 75 which rests against the film flattens the film as it comes directly over the opening.

Actuating mechanism

Pivotally secured to the inside of the housing as at 76 is a support 77 on which is mounted the actuating mechanism 78 for advancing the film. Referring specifically to Figures 6, 10, 11, 12 and 16, I provide a pair of journals 79 on the support on which is supported a transverse shaft 80. Fixedly mounted on said shaft are a pair of sprocket wheels 81 and 82 whose teeth extend into the magazine, when in position for operation, through suitable openings therein, for engagement with the film openings 83. Fixedly mounted on said shaft is a pulley 84 which is adapted through a spring belt 133 to drive the takeup film roll 71. Also fixedly mounted on said shaft is a gear 85 which drives a chain of gears 86. The pinion gear 87 of the gears drives centrifugal acting braking arms 88 which engages the drum of the braking member 89. It will thus be seen that with the rotation of the gears 86 the braking arms are urged outwardly into braking engagement with the drum, thus the speed of the sprocket gears, advancing the film, is evenly regulated.

Fixedly secured to the other side of the shaft 80 (Fig. 12) is a ratchet gear 90 which is to be engaged by a pawl 93 when the pawl moves in a counterclockwise direction. Also loosely mounted on said shaft is a sleeve 91 which has an upstanding rockable arm support 92 which carries the pawl 93 and an oppositely directed pawl 94, both of which are spring tensioned, and are adapted to engage the oppositely rotating ratchet gears 90 and 95 respectively. Loosely mounted on the sleeve is an insulated bushing 96 which fixedly supports the ratchet gear 95 to be engaged by the pawl 94 when the pawl moves in clockwise direction. Also fixedly mounted on said bushing is a metal commutator disc 97 having insulated sections 98 therein. This plate is in electrical contact with a pair of brushes 99 and 99a which are connected in the electric circuit presently to be described. It will be understood that in certain positions of the disc an electrical circuit is completed through said brushes, while in other positions of the said disc the electrical circuit is open. Also fixedly mounted on said shaft is a pinion gear 100 supported between two plates 101 and 102 which pinion gear is adapted to be engaged and operated by a rack bar 103 presently to be described. The pinion gear has teeth extending only around a portion of its circumference. Secured to the outside plate 102 is a cam member 104 (Fig. 10) which, as the plate is rotated in clockwise direction, serves to trip a shutter mechanism generally indicated at 105 (Fig. 12).

On the end of said shaft I provide a suitable end nut. Also suitably supported on the arm support 77 is a solenoid and core 106 to which is secured the rack 103 which engages with the pinion 100 and serves to impart a rotary motion thereto. The opposite end of the rack bar is secured as by a spring 107 to an arm 108 which in turn is secured to the supporting arm. Secured to the core 106 is a bar 195 which passes under the pinion 100 and which serves to prevent the rack 103 from moving upwardly out of the plane of movement. It will be understood that normally the core and rack 103 are in the position shown in Figure 10 but that when said solenoid is energized, as will more presently be described, in the electrical circuit, the rack is then moved inwardly or to the left as shown in Figure 10 imparting a counterclockwise movement to the pinion 100 and to the sleeve 91 and arm 92. As the arm 92 moves counterclockwise the pawl 93 will engage the teeth on the ratchet gear 90 to move the gear counterclockwise and simultaneously move the shaft 80 and sprocket wheels 81 and 82 counterclockwise. The pawl 94 will override the teeth on the gear 95. However as soon as the solenoid 106 is demagnetized by the opening of the circuit the tension of the spring 107 will move the rack 103 in the opposite direction, i. e., in a clockwise rotation and impart the same rotation to the pinion 100, sleeve 91, support arm 92 and to the pawl 94, which in turn will engage the teeth on the gear 95 to rotate said gear and the electrical commutator plate 97 clockwise to bring the metal segments into engagement with the brushes 99 for the closing of an electrical circuit. As the sleeve 91 moves in a clockwise direction, it will rotate with it the plate 102 which carries the cam member 104 to trip the pawl 109, which in turn will pivot the lever 110 and move lever 111 to the right (shown in Fig. 10) to open the shutter 112 on the camera lens for an exposure. It will be seen that with the counterclockwise movement of the plate 102 that the cam will actuate the pawl in the opposite direction and no motion will be imparted to the lever and hence no action is imparted to the shutter. Secured to said pivotal arm support 77 is a spring 115, the opposite end of which is secured to the housing and which normally tends to maintain the arm support in its upward position so that the sprocket gears are in line to be in engagement with the film. Also mounted on the support arm are a pair of pawls 197 and 198 which engage the gear 90, 95 respectively, to prevent any reverse rotation of the direction of rotation of said gears.

Supported by suitable journals 116a which are mounted on the underside of the top of the housing 26 (Figures 13 and 14), I provide a shaft 116 on which is fixedly mounted a cam member 117 and a pair of hook members 118. The hook members are adapted to engage suitable clamping loops 119 formed on the under side of the magazine, which loops extend through suitable openings in the top of the housing to be engaged by said hooks and which lock said magazine to said housing. With the cam in position as shown in Figure 14 the pivotally mounted arm support 77 is depressed so that the sprocket gears 81 and 82 are out of engagement with the film opening and the clamping hooks 118 are out of engagement with the clamping loops, 119. With the sprocket gears out of engagement with the film openings the magazine 25 will be in a position to be disengaged from the housing, providing the slide is in its fully inserted position as shown in Fig. 6. Also mounted on the shaft 116 is a gear 120 (Fig. 6) which engages a rack 121 which in turn operates another gear 122 to operate a pair of clamping members 123 similar to those hereinbefore described. The clamping members engage suitable hook loops 124 simultaneously with the engagement of the first mentioned loops.

Also mounted on the shaft 116 is a cam member 125 (Fig. 7) positioned so that when the shaft is in such position that the hooks are in engagement with the looped openings, the cam will be in the position as shown in Figure 7 which will effect a closing of the switch indicated generally at 126 and more presently to be described in connection with the electrical circuit. On the right side of the housing (Figs. 6 and 8) I provide a switch 127 which is adapted to be closed by the dark plate when the dark plate is in its fully withdrawn or "out" position, i. e., when the exposure opening is uncovered. To enclose the entire actuating mechanism I provide a suitable light tight casing 130a. In the side wall of the casing (Figures 16, 17 and 18) I provide a shaft 130 supported in a bushing 131, on which shaft is mounted a pulley 132. Around the pulley I provide a spring belt 133 which is in engagement with the pulley 84, so that as the sprocket gears are operating the takeup spool will likewise be rotated to take up on the film. Supported in a suitable bushing 134 in the wall of the magazine housing I provide a shaft 135 on which is mounted the takeup spool 71. Between the shaft 130 and the shaft 135 I provide a positive acting clutching member 136 by which, when the clutches are engaged as shown in Figure 16, both shafts will rotate simultaneously. However, if it is desired to remove the magazine from the housing the shaft 135 is moved towards the left out of engagement with the spring retaining members 137 and the clutch is disengaged, after which the magazine is no longer locked to the shaft 130. To normally retain the takeup spool on the shaft 135 I provide a spring 138 secured to the inside of the magazine which urges the takeup roller towards the left as shown in Figure 16. The side wall of the magazine is removable so that the spool can be removed from the shaft.

Electrical circuit

Referring to the diagrammatic view of Figure 19 which shows the electrical circuit it will be seen that when the slide is in fully retracted position, so that the exposure opening in the magazine is uncovered, the switch 127 will be closed. Also if the magazine 60 is locked to the housing, the cam 125 will be in the position shown in Fig. 7 with the switch 126 closed. Therefore the circuit leading to the manually operated switch 150 (on the machine) from the power source will be closed. If, however, the slide is not in retracted position or the magazine is not locked to the housing, the switches 127 and 126 would be open and the closing of the manually operated switch 150 to start the machine in operation would be of no avail. Assuming that the slide is in its retracted position in which event the switch 127 will be closed, and the magazine locked to the housing with the switch 126 closed, the machine will be in condition for operation by the closing of the manual switch 150. The current will pass from its source through wire 151, switches 127, 126 and 150 to the relay 152 to wire 175 to contact point 176 which is normally in contact with the switch plate 177. The current will pass through the plate 177 to wires 178, 179, and return through wire 180 to complete the circuit. Relay 152 will be energized to draw plate 153 towards it to make contact at 181. The current will then pass through wires 182, 183 through plate 153 through contact point 181 through wire 154 to the solenoid 155, through wires 184, 179 and returned through wire 180. The solenoid 155 will be magnetized to move the cone 106 and rack 103 to the left and rotate pinion 100 counterclockwise, to effect the operation of the actuating mechanism to advance the film. As the rack moves to the left the switch plate 177 will be moved with it to open the circuit at contact point 176 and close the circuit through points 186 and 187. The relay 152 will be de-energized and the circuit to the solenoid 49 will be closed through wires 182, 189, points 187 and 186 through switch 185 and wires 188 and 180. The solenoid 49 will be energized to move the bar outwardly to lock in engagement with the post and lock the housing against vertical movement. As the bar 103 is moved to its furthest left position the core extension 106a strikes plate 153 to move it the full line position (shown in Fig. 19) to move the plate away from point 181, thus breaking the circuit to the solenoid 155, which will cause the bar 103 to move to the right, by the spring 107. As the bar moves in that direction it will rotate the pinion 100 clockwise and through the actuating mechanism cause the commutator 97 to rotate clockwise, so that the brushes will be in contact with the conducting segments of the commutator. As the commutator is rotating the current will flow through wires 192 and 190, through brush 99, commutator 97, brush 99a, wire 191 to lamps 156 to illuminate same and out through wire 193.

Simultaneously with the clockwise movement of the commutator, the plate 102 and cam 104 will likewise rotate clockwise to actuate the levers 105 to operate the shutter of the lens. Thus it will be seen that upon the return movement of the rack after the film is positioned in its new position, the lights are illuminated and the shutter tripped simultaneously for exposure of the film. As said action takes place, the circuit to the solenoid 49 remains closed so that the ratchet teeth are in engagement with the post and thus the housing is positively locked against movement.

When the rack 103 has reached the full end of its movement to the right, it will move plate 177 back to the position shown in Fig. 19, which will open the circuit through contacts 186 and 187, thus de-energizing solenoid 47 to release its locking engagement with the post. Thus the machine is conditioned for a repeat operation by closing of the switch 150.

194 is a full wave rectifying unit, connected in the circuit so that when alternating current is used, it will be converted into direct current for the operating mechanism, and will eliminate vibration and hum which would otherwise arise from the use of alternating current to actuate the solenoids and relays. This unit can be cut out by a suitable switch (not shown) where direct current is used.

I claim:
1. In a device of the class described including a supporting table for the object to be copied, a housing having a transparent plate at the lower end thereof and a film magazine and a camera positioned at the top thereof, all movable vertically as a unit with said housing, said film magazine detachably mounted on said housing, said supporting table having a plurality of sections each movable vertically independent of the other, border members surrounding said sections and adapted to effect a light seal with said transparent plate.

2. A device of the class described including a support for the object to be copied, a housing movable vertically with respect to said support, a transparent plate on said housing, said plate adapted to be positioned on the object to be copied, a camera mounted on said housing in fixed focus with relation to said plate, means for automatically immovably locking said housing with respect to said support and simultaneously operating said camera.

3. A device of the class described including a support for the object to be copied, a housing structure movable vertically with respect to said support, said housing structure having illuminating means therein, a camera mounted on said housing, a magazine containing film removably mounted on said housing structure, means for advancing said film, an electrical switch for actuating means whereby said housing structure is immovably locked in position over the object to be copied and said film advancing means simultaneously actuated to place a film in position for exposure.

4. A device of the class described including a support for the object to be copied, a housing vertically movable with relation to said support, a transparent plate secured to the lower end of said housing and adapted to be positioned over the object to be copied, a camera mounted on said housing in fixed focus with relation to said plate, a film magazine provided with an exposure opening detachably mounted on said housing in alignment with said camera, a slide for closing said opening, said slide when in retracted position adapted to prevent detachment of said magazine from said housing and to permit operation of said camera.

5. In a device of the class described, a support for the object to be copied, a housing structure vertically movable with relation to said support, a transparent plate and a camera both maintained rigidly in fixed focus relationship by said housing structure, a film magazine provided with an exposure opening detachably mounted on said housing structure and in alignment with said camera, a slide for closing said opening, means for locking said magazine on said housing structure, said slide when in retracted position adapted to further lock said magazine on said housing to prevent detachment therefrom.

6. In a device of the class described, a supporting table for the objects to be copied, a housing of rigid construction, a transparent plate at the lower end thereof, a camera and a film magazine mounted on the top thereof, all movable vertically as a unit with said housing, said magazine detachably secured to said housing and provided with means for locking said magazine to said housing while said camera is being operated.

7. In a device of the class described, a support for the object to be copied, a movable housing having illuminating means therewithin, a transparent plate secured to the lower end of said housing and adapted to be positioned over the object to be copied, a camera in fixed focus with relation to said plate mounted on said housing, a magazine containing film detachably mounted on said housing in alignment with said camera, means positioned externally of said magazine for advancing said film, said means including a shaft having a pair of sprockets for engagement with said film, a pair of oppositely rotatable ratchet wheels mounted on said shaft, a pair of oppositely directed pawls, one of said pawls adapted to engage one of said ratchet wheels for rotating said shaft in one direction to rotate said sprockets, the other of said pawls adapted to engage the other of said ratchet wheels to rotate said ratchet wheel in the opposite direction and simultaneously rotate therewith a commutator for actuating said illuminating means.

8. A device of the class described including a support for the object to be copied, a housing structure vertically movable with respect to said support, illuminating means within said housing structure, a transparent plate supported by said housing structure, a camera supported on said housing structure in fixed focus with relation to said plate, a magazine containing film detachably mounted on said housing, means for advancing said film, an electrical switch adapted to actuate means to cause said housing to be immovably locked with respect to said support and simultaneously to actuate said film advancing means to place a film in position for exposure, means for simultaneously automatically actuating said illuminating means and operating a shutter in said camera to expose said film when said film is so positioned, said illuminating means automatically adapted to be extinguished and said housing structure adapted to be unlocked when the exposure of said film has been effected.

9. In a photographic copying apparatus of the character described, a housing structure having opaque walls, a camera positioned on said housing, a transparent plate mounted on said housing and in the focal plane of said camera, a supporting table for the object to be copied, said table comprising a plurality of elements each being independently reciprocable in a vertical direction and supported on resilient means, said housing being movable vertically relative to said supporting table and arranged to be positioned so that said plate contacts the object to be copied, the said elements thereupon moving to varying depths to accommodate the object but resiliently retaining said object in engagement with said plate and in the focal plane of said camera, those of said elements not supporting said object contacting said plate and providing an effective seal for opposing the passage of light from and into said housing.

10. In a photographic copying apparatus of the character described, a housing structure having opaque walls, a camera positioned on said housing, a transparent plate mounted on said housing and in fixed focal relationship with respect to said camera, a supporting table for the object to be copied, said table comprising a plurality of unit sections, each of said unit sections being independently yieldable, said housing being vertically movable relative to said supporting table and arranged to be positioned so that said plate contacts the object to be copied, the said unit sections thereupon yieldably moving to varying portions to accommodate the object to be copied and resiliently retaining said object in contact with said plate and in the focal plane of said camera, those of said unit sections not supporting said object arranged to contact said plate and to provide an effective seal for opposing the passage of light from and into said housing.

11. In a photographic copying apparatus of the character described, means for supporting an object to be copied, a housing having a transparent plate fixed in the lowermost portion thereof and being vertically movable relative to said supporting means, a camera fixed on said housing so that the lower surface of said plate is in the focal plane of said camera, said housing with said camera adapted to be moved whereby the object to be copied is positioned in the focal plane of said camera, and means for initiating operation of the camera and locking said housing against movement relative to the object when said housing is so positioned.

12. In a photographic copying apparatus of the character described, a housing, a supporting structure therefore, said housing having opaque walls and being vertically movable relative to said supporting structure, a camera mounted on said housing, a transparent plate mounted in fixed focal relationship with respect to said housing, illuminating means mounted interiorly of said housing and arranged so that the incident rays of light from said illuminating means will be reflected to points beyond the lens of said camera, a platen mounted on said supporting structure, said platen having a resilient peripheral sealing strip mounted thereon, said strip arranged to contact the edges of the transparent plate so that objects to be copied may be placed on the platen and transmission of light into the housing is prevented.

CHARLES LIEBMAN.